United States Patent [19]
Janes

[11] Patent Number: 5,881,549
[45] Date of Patent: Mar. 16, 1999

[54] REHEAT ENHANCED GAS TURBINE POWERPLANTS

[75] Inventor: Clarence W. Janes, Sacramento, Calif.

[73] Assignee: California Energy Commission, Sacramento, Calif.

[21] Appl. No.: 775,898

[22] Filed: Jan. 2, 1997

Related U.S. Application Data

[63] Continuation-in-part of Ser. No. 546,729, Oct. 23, 1995, Pat. No. 5,590,518, which is a continuation-in-part of Ser. No. 182,661, Jan. 12, 1994, Pat. No. 5,490,377, which is a continuation-in-part of Ser. No. 139,525, Oct. 19, 1993, abandoned.

[51] Int. Cl.$^6$ .................................. F02C 3/28; F02C 7/10
[52] U.S. Cl. ...................... 60/39.12; 60/39.17; 60/39.511
[58] Field of Search ................................ 60/39.12, 39.17, 60/39.511, 39.58, 39.59, 736

[56] References Cited

U.S. PATENT DOCUMENTS

| | | |
|---|---|---|
| 3,166,902 | 1/1965 | Maljanian et al. . |
| 3,785,145 | 1/1974 | Amann . |
| 3,949,548 | 4/1976 | Lockwood, Jr. . |
| 3,969,892 | 7/1976 | Stettler et al. . |
| 4,182,127 | 1/1980 | Johnson . |
| 4,765,142 | 8/1988 | Nakhamkin . |
| 4,858,428 | 8/1989 | Paul . |
| 4,872,307 | 10/1989 | Nakhamkin . |
| 4,885,912 | 12/1989 | Nakhamkin . |
| 5,095,693 | 3/1992 | Day . |
| 5,133,180 | 7/1992 | Horner et al. . |
| 5,161,365 | 11/1992 | Wright . |
| 5,313,790 | 5/1994 | Barr . |
| 5,347,806 | 9/1994 | Nakhamkin . |

FOREIGN PATENT DOCUMENTS

| | | |
|---|---|---|
| 851940 | 10/1960 | European Pat. Off. . |
| 150990 | 8/1985 | European Pat. Off. . |
| 52-15917 | 2/1977 | Japan . |
| 60-93132 | 5/1985 | Japan . |
| 2227796 | 8/1990 | United Kingdom . |
| 2232721 | 12/1990 | United Kingdom . |
| 2264539 | 9/1993 | United Kingdom . |

OTHER PUBLICATIONS

CEC, "Chemically Recuperated Gas Turbine . . . and Reheat", Gas Turbine World, p. 37, 1992.
Electric Power Research Institute, "The HAT Cycle", undated.
Janes, C.W., "Increasing Gas Turbine Efficiency Through the Use of a Waste Heat Methanol Reactor", Amer. Chem. Society, 1979.
Miakansi, J., "Developments to Watch, The Next Generation of Powerplants", Power Magazine, vol. 34, No. 6, Jun. 1990.

*Primary Examiner*—Louis J. Casaregola
*Attorney, Agent, or Firm*—John P. O'Banion

[57] ABSTRACT

A gas turbine driven powerplant in which a mixture of steam and a combustible hydrocarbon, such as methane, is reformed or partially oxidized to produce a hydrogen-rich fuel which is used to fuel both the primary combustor and a reheat combustor positioned upstream of the final turbine stage, such as the power turbine. Reheat combustion is effected by injecting the hydrogen-rich fuel into the gas flow path between turbine stages where the fuel auto ignites with complete combustion occurring at a nominal distance after injection into the air stream. Further, the hydrogen-rich fuel can be used as a coolant for the turbine stages to allow higher reheat temperatures to be achieved.

11 Claims, 2 Drawing Sheets

REHEAT ENHANCED GAS TURBINE POWERPLANTS

CROSS-REFERENCE TO RELATED APPLICATIONS

This application is a continuation-in-part of application Ser. No. 08/546,729 filed on Oct. 23, 1995, now U.S. Pat. No. 5,590,518, which is a continuation-in-part of application Ser. No. 08/182,661 filed on Jan. 12, 1994, now U.S. Pat. No. 5,490,377, which is a continuation-in-part of application Ser. No. 08/139,525 filed on Oct. 19, 1993, now abandoned.

Application Ser. No. 08/546,729 filed on Oct. 23, 1995, now U.S. Pat. No. 5,590,518, and U.S. Pat. No. 5,490,377 are incorporated herein by reference in their entirety.

BACKGROUND OF THE INVENTION

1. Field of the Invention

This invention pertains generally to gas turbine driven powerplants, and more particularly to a gas turbine driven powerplant in which a mixture of steam and methane, or another combustible, is reformed or partially oxidized to produce a hydrogen-rich fuel which is used to fuel both the primary combustor and a reheat combustor.

2. Description of the Background Art

Gas turbine driven powerplants that are capable of reheating the gas path between stages of turbine expansion can achieve a significant gain in power output compared to powerplants without reheat capabilities. Raising the gas path temperature generally requires the introduction of a combustible fuel into a reheat combustor. However, reheat combustion using typical gas turbine fuels, such as natural gas or a liquid petroleum fraction, requires a flame holder, a combustion volume for mixing and ignition, and a liner similar to what is required for a typical gas turbine combustor. A further drawback is that these fuels produce additional NOx emissions. Additionally, the gain achieved through reheat combustion implemented in this manner can be negated by the development cost, additional emission controls required, and the additional gas path pressure drop that results. Therefore, there is a need for a gas turbine driven powerplant which includes a reheat combustor which does not require a flame holder, does not entail the development cost associated with turbine cooling, and which requires little or no modification of existing gas turbine engine technology. The present invention satisfies that need, as well as others, and overcomes the deficiencies in conventional reheat technology.

SUMMARY OF THE INVENTION

This invention pertains generally to gas turbine driven powerplants that expand high temperature, high pressure, effluent gas from the combustor through more than one turbine stage. From the expansion of the gas through the initial turbine stage, shaft work is extracted from the gas path which reduces the gas temperature leaving that stage. By restoring the loss of temperature to the gas path through reheating prior to its expansion in the following turbine stage, a gain in shaft work extracted in that stage results. The present invention provides for the main gas path temperature to be raised between turbine stages without the need for a flame holder or a combustor liner, without suffering an additional gas path pressure drop, and without introducing additional $NO_x$ to the gas path.

In general terms, the invention makes use of a unique combustion characteristic of hydrogen; that is, hydrogen exhibits a high flame velocity enabling stable combustion in a highly dilute gaseous fuel. The high dilution in the fuel ensures that essentially no $NO_x$ is formed during combustion. An essential characteristic of this hydrogen-rich fuel is that it is auto-ignitable and no flame holder is required for ignition and combustion to occur. The hydrogen-rich fuel can be manufactured from natural gas or from liquid petroleum fractions, and process options for producing the fuel include steam reforming, autothermal reforming, or catalytic or non-catalytic partial oxidation. The hydrogen-rich gaseous fuel can then be introduced into the gas path between turbine stages where it auto-ignites. Many varying manners of fuel introduction are possible, although it is desirable to achieve a minimum gas path pressure drop and maximum level of mixing of the hydrogen-rich fuel gas and the oxygen in the gas path within the shortest possible time; that is, within the time the gas flows from one turbine stage to another.

By way of example, and not of limitation, in my previous patent U.S. Pat. No. 5,590,518 which is owned by the assignee of this application, I explained that in order to effect reheat combustion, a hydrogen-rich fuel gas effluent from a reformer could be introduced into the gas turbine flow path from the trailing edge of the stationary vanes and/or rotating blades of the low pressure turbine up stream of the power turbine. The hydrogen-rich fuel could also be introduced into the gas turbine flow path through nozzles at any practical point between the low pressure turbine and the power turbine, but use of orifices in the low pressure turbine assembly allows the fuel to accomplish both cooling as well as excellent dispersion of the fuel. Because the hydrogen-rich fuel will spontaneously auto-ignite at temperatures of 1000° F. or less when injected into an air stream containing oxygen, this fuel also allows the development of low cost primary combustors to take the place of high cost combustors now being marketed to reduce the production of $NO_x$. Another option would be to introduce the fuel from the trailing edge of the blades of the final compressor stage, simultaneously eliminating the conventional combustor altogether and cooling this hottest compressor stage.

In my co-pending application Ser. No. 08/546,729 filed on Oct. 23, 1995, now U.S. Pat. No. 5,590,518 which is also owned by the assignee of this application, I further explained that the hydrogen-rich fuel could be created through autothermal reforming (in which air is injected as the methane and steam flow across the reforming catalyst in order to keep the temperature high enough to produce the desired reformed fuel) or through a process known as partial oxidation which uses a different catalyst, and that partial oxidation might be used, for example, with liquid or gaseous fuels that do not readily lend themselves to be reformed in a conventional methane/steam reformer. A further alternative available if the fuel mixture to be reformed has a sufficiently high temperature is to use an adiabatic bed of a suitable catalyst outside the exhaust stream (similar to the autothermal reformer but without adding a flow of air) which will lower the temperature of the fuel as it is reformed. This could be particularly useful where this fuel is used as a coolant for the power turbine or other hot section parts prior to combustion. I also explained that, by effectively burning more oxygen out of the air stream through reheat combustion, overall cycle efficiencies can be achieved that would not be possible in a single-fired gas turbine unless the firing temperature were raised several hundred degrees higher. However, raising the firing temperature would present serious problems in effectively cooling turbine parts as well as $NO_x$ control problems. Not only are these problems avoided by using the hydrogen-rich, low $NO_x$ fuel to effect cooling of the power turbine, but the efficiency of the cycle may also increase by permitting less air to be bled from the compressor(s) for cooling of turbine hot section components. Three additional enhancements to this cycle might also be employed.

First, the hydrogen-rich fuel might be produced at two different pressures corresponding to the pressures required to enter the primary and reheat combustion zones. This would allow more hydrogen to be produced in the low pressure fuel stream because the methane steam reforming reaction is more efficient at lower pressures.

Second, fuel streams that are also used to cool the power turbine or other hot section components can be routed through two reforming beds before and after the cooling task to increase the hydrogen content of the fuel and increase the effectiveness of turbine and hot section cooling. The first reforming catalyst bed could be placed between the point where the steam/fuel mixture reaches its hottest temperature in the exhaust stream and the point where the mixture enters the power turbine or other hot section components for cooling purposes. This first reformer would lower the temperature of the steam/fuel mixture while producing some hydrogen. The mixture would then pick up more heat inside the metal parts of the power turbine or other components and when it exits the power turbine or other components, it could be routed through a second reforming catalyst bed which would again exchange heat for additional chemical fuel value (more hydrogen) prior to routing the fuel to the combustor and/or reheat combustor. This could be particularly desirable where the fuel is injected into the air flow through the cooling passages of the low pressure turbine upstream of the power turbine. In this way, thermal limits of both the low pressure turbine and the power turbine might be satisfied while still obtaining significant reheating of the gas flow through the cycle.

A third enhancement, which also addresses the problem of the thermal limit on the amount of reheat that can be achieved, would be to tap the shaft that drives the compressor(s) for additional generation or direct drive power at the "cold end" of the cycle. By taking power out in addition to the power required to drive the compressors, the pressure of the gas exiting the low pressure turbine is reduced, and this additional expansion of this flow of gas will also reduce the temperature of the gasses exiting this turbine, making them available for more reheating without increasing the temperature of gasses entering the power turbine. This enhancement should permit additional fuel to be converted to power at nearly 100 percent efficiency because no additional water or air need be added to the cycle.

An object of the invention is to allow effective reheat in gas turbine engines using existing turbine cooling strategies and without requiring costly development of new reheat combustor equipment.

Another object of the invention is to allow effective reheat in gas turbine engines without significant changes to the design of existing gas turbines or adding new equipment.

Another object of the invention is to employ closed-loop cooling of the power turbine in a steam injected gas turbine cycle in order to permit reheat to temperatures approaching those in the high pressure turbines of such engines.

Another object of the invention is to generate a low-$NO_x$ fuel that will, when burned in a low-$NO_x$ combustor, reduce emissions of $NO_x$ to meet or exceed emission limitations without the use of SCR/ammonia (e.g. generate a hydrogen-rich sulfur free, highly steam diluted fuel).

Another object of the invention is to generate more thermal power (heat release) per mass flow of inlet air to the gas turbine than conventional gas turbine powerplants (i.e. achieve practical levels of oxygen depletion from reheat combustion at temperatures made possible by this invention and from the use of dilute fuels available as a result of this invention).

Another object of the invention is to convert the energy released in the combustion of fuel into shaft work with greater efficiency than conventional gas turbine powerplants (i.e. leave a minimum of residual energy in the stack gas, the only significant source of energy unconverted to shaft work).

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF PREFERRED EMBODIMENTS

Figure 1:
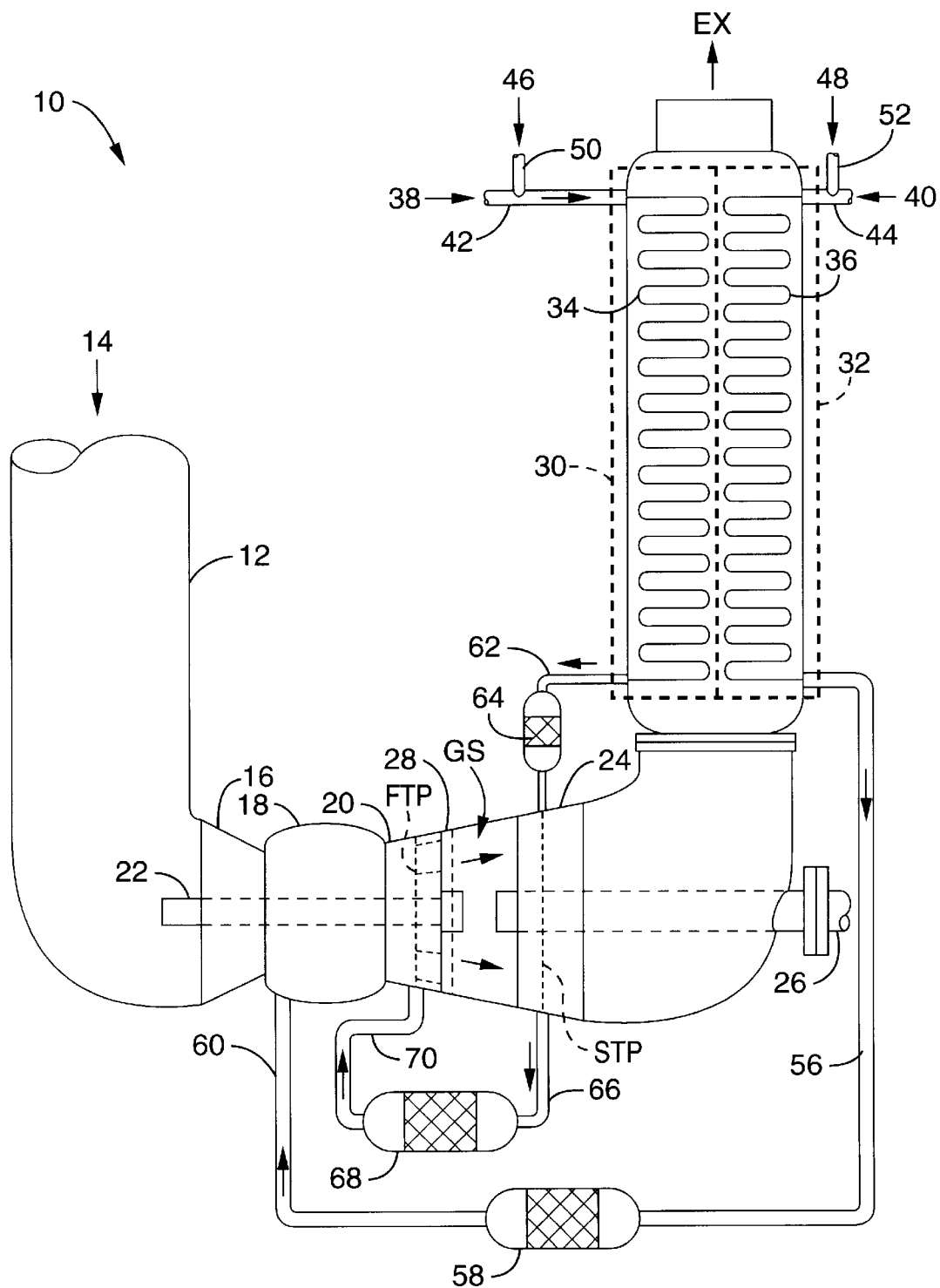
FIG. 1 is a schematic diagram of a gas turbine driven powerplant in accordance with the present invention wherein two parallel flows of water and methane occur in the exhaust stream at different pressures and the resulting steam/fuel mixtures are reformed in adiabatic reforming beds of catalyst to produce a hydrogen-rich fuel prior to being routed to the main and reheat combustion zones, and wherein the lower pressure reheat fuel flow is shown being reformed both before and after its use as a coolant for the power turbine.

Referring more specifically to the drawings, for illustrative purposes the present invention is described with reference to FIG. 1 through FIG. 2, where like reference numerals denote like parts. It will be appreciated, however, that the apparatus may vary as to configuration and as to details of the parts without departing from the basic concepts as disclosed herein.

Referring first to FIG. 1, an example of a gas turbine powerplant 10 according to the present invention is shown. Powerplant 10 typically includes a compressor inlet 12 for receiving filtered air 14 for compression, at least one compressor 16 for producing a downstream flow of air, a combustor 18 positioned down stream of compressor 16, at least one turbine 20 positioned downstream of the combustor 18 and mechanically connected to compressor 16 by a shaft 22, and a final turbine 24 positioned down stream of turbine 20 and mechanically connected to a load by a shaft 26. The final turbine 24 may be either a separate power turbine connected only aerodynamically to the last turbine/compressor stage as shown, or it may be the turbine that drives the lowest pressure compressor in a multiple compressor configuration. Those skilled in the art will appreciate that the powerplant configuration described can include additional compressor/turbine stages, and that shaft 26 can be used to power an electrical generator or another form of mechanical load.

In a conventional turbine 20, one or more of the stationary vanes and/or rotating blades contain internal passages FTP through which a coolant can be directed. In some engines, however, the final stage of this turbine may not presently be cooled and, therefore, orifices for allowing the hydrogen-rich fuel to be injected into the gas path would have to be added. A hydrogen-rich fuel is injected through those internal passages into the main gas stream flow GS to effect reheat combustion. Not only will the hydrogen-rich fuel act as a coolant for the turbine but, because of the unique combustion characteristics of the hydrogen component as well as the high temperatures of the low-$NO_x$ fuel and the air in the gas stream, the fuel exiting the trailing edge of the stationary vanes and/or rotating blades of turbine 20 will spontaneously auto-ignite, with complete combustion occurring at a nominal distance after injection into the gas stream GS flowing between turbine 20 and final turbine 24. In this manner, a reheat combustor 28 is created in the flow path between turbine 20 and final turbine 24. It will be appreciated, therefore, that reheat combustion can be readily accomplished using available stationary vanes and/or rotating blades with their existing internal air cooling passages (or passages created for this purpose) to convey the low $NO_x$ fuel to the trailing edge injection orifices for injection into the main gas stream. While the hydrogen-rich fuel can be introduced into the gas path in any manner, use of internal cooling passages in the turbine blades and vanes allows the manufacturer to obtain the efficiency benefits of reheat combustion without significant or costly redesign of the final turbine, and without adding new equipment. Also, because the methane/steam reformation reaction is also a function of temperature, this reheat will enhance the chemical recuperation of heat from the exhaust gas stream.

Note also that, when dealing with rotating turbines, there may be slight leakage of fluids which are directed through those turbines. This is generally not a concern with the present invention since, if the hydrogen-rich fuel flowing through the cooling passages STP in final turbine 24 were to leak into the main gas stream, it would simply auto-ignite and provide an additional degree of reheating. However, if leakage of the combustible fuel is a concern, it could also be prevented entirely by injecting pure steam at sufficient pressure at or near the point of potential leakage to ensure that only pure steam leaks from that point.

The same chemical recuperation of exhaust heat that occurs in the exhaust stream in the powerplant configurations described in my co-pending application Ser. No. 08/546,719 filed on Oct. 23, 1995, now U.S. Pat. No. 5,590,518, might also be accomplished in one or more adiabatic beds of reforming catalyst through which steam/fuel mixture, at sufficient temperature, could be routed, significantly reducing the temperature of the steam/fuel mixture and converting that heat to additional chemical fuel (hydrogen-rich). In the example shown in FIG. 1, the exhaust gas stream EX is divided between two parallel "once-through" heat exchangers 30 and 32, each with fuel carrying coils 34 and 36, respectively. These parallel heat exchangers convert a mixture of a combustible hydrocarbon 38 and 40 such as methane introduced into fuel inlets 42 and 44, respectively, and water 46 and 48 introduced into water inlets 50 and 52, respectively, into two mixtures of combustible hydrocarbon and steam at two pressures chosen to match the pressures needed for the fuel mixture to enter the primary and reheat combustion regions. It will be appreciated that the initial pressure differential is set by the input pressures of the water and combustible hydrocarbon introduced into the heat exchangers, with the input pressure to the high pressure heat exchanger being higher than the input pressure to the low pressure heat exchanger. The fuel from the high pressure heat exchanger 32 will exit fuel carrying coil 36 though fuel outlet 56 and enter reformer bed 58. The hydrogen-rich fuel exiting reformer bed 58 will then flow through combustor inlet 60 to combustor 18. The fuel from the low pressure heat exchanger 30 will exit fuel carrying coil 34 through fuel outlet 62 and enter reformer bed 64. The hydrogen-rich fuel exiting reformer bed 64 will then flow through the internal passages in power turbine 24, picking up heat and cooling the metal parts of that turbine assembly prior to being routed through fuel outlet 66 to reformer bed 68 for further reforming of the fuel. The low pressure fuel will then be routed through turbine inlet 70 to reheat combustor 28.

It will be appreciated that, because the hydrogen-rich fuel will auto-ignite when mixed with air where high temperatures are involved, it is important to avoid pre-mixing the fuel with air before introduction into the gas path. Otherwise, the fuel may ignite in the pipes or orifices introducing the fuel into the gas path due to the high temperatures in the turbine stages. Furthermore, it may be desirable to employ one or more check valves and pressure sensors to prevent a backflow of the hydrogen-rich and/or to cut off the flow of fuel where the air pressure in the gas flow would be great enough to push the fuel back into the pipes or orifices.

Figure 2:
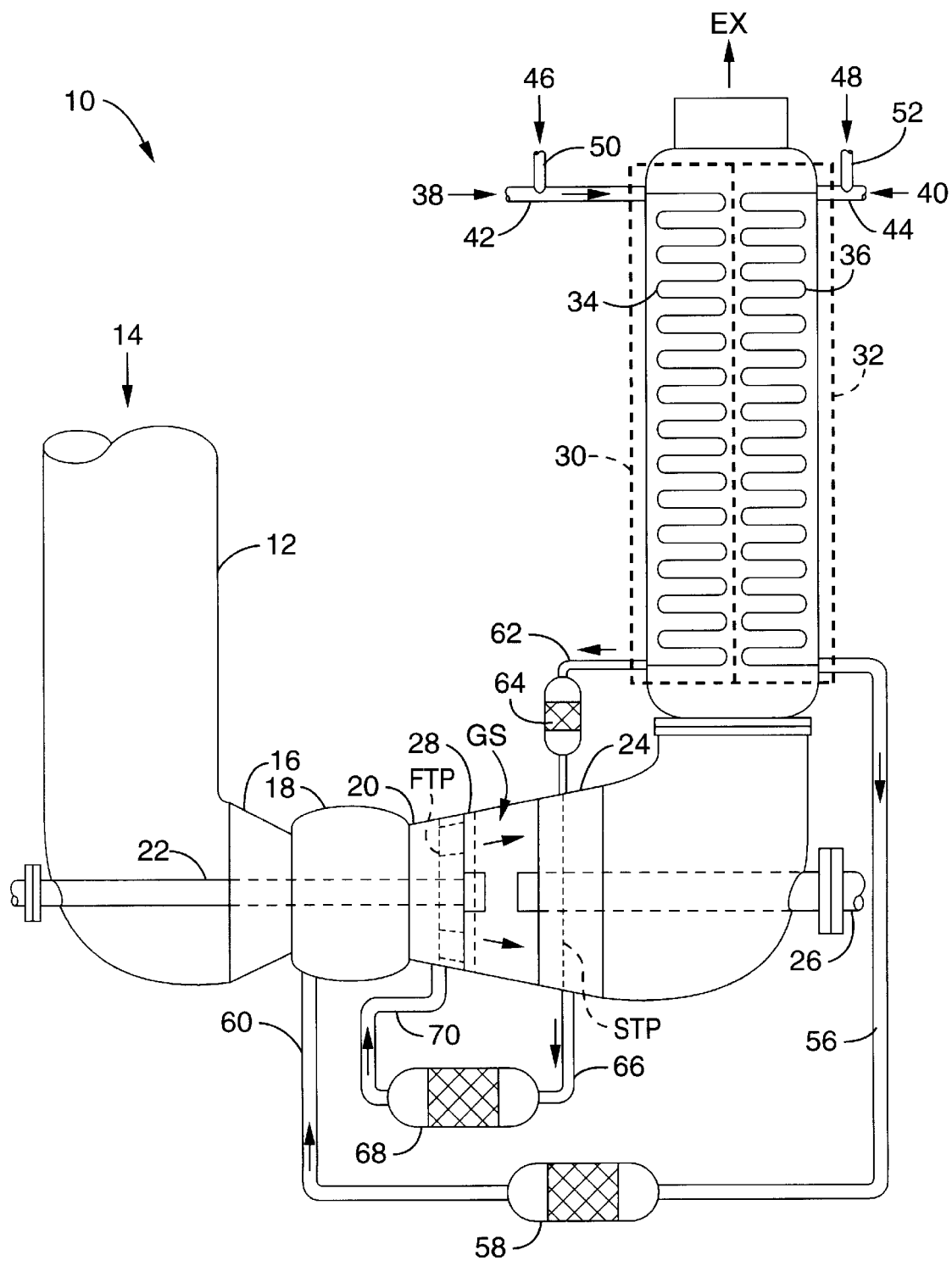
FIG. 2 is a schematic diagram of an alternative embodiment of the gas turbine driven powerplant shown in FIG. 1 in which additional power or motive force is generated from the "cold end" of the cycle allowing additional reheat to occur without raising the temperature limits of the power turbine.

Referring now to FIG. 2, it will be noted that shaft 22 has been extended so that in addition to providing power to drive compressors 16, it can also be used to generate electricity or provide power for a direct drive application. This design, which could be applied to any of the powerplant configurations shown in my co-pending application Ser. No. 08/546,729 filed on Oct. 23, 1995, now U.S. Pat. No. 5,590,518, allows for greater expansion of the gases through turbines 20, which in turn reduces its temperature so as to allow reheat combustor 28 to increase the temperature of the gases to a greater degree without violating the temperature limits of final turbine 24. This permits more of the oxygen in the air to be burned, increasing the total power and efficiency of the cycle. Thus, more reheat will occur with or without power turbine cooling.

Although the description above contains many specificities, these should not be construed as limiting the scope of the invention but as merely providing illustrations of some of the presently preferred embodiments of this invention. It will further be appreciated that the invention presented herein can be incorporated into many alternative powerplant designs. Thus the scope of this invention should be determined by the appended claims and their legal equivalents.

What is claimed is:

1. A gas turbine driven powerplant, comprising:

(a) compressor means for producing a downstream flow of air;

(b) a combustor positioned downstream of the compressor;

(c) a first turbine positioned downstream of said combustor, said turbine coupled to said compressor by a shaft;

(d) a reheat combustor positioned downstream of said turbine; and (e) a second turbine positioned downstream of said reheat combustor;

(f) said reheat combustor comprising a region within the path of air flow between said first turbine and said second turbine wherein hydrogen-rich fuel introduced into said region auto-ignites to create reheat combustion;

(g) wherein said hydrogen-rich fuel flows to said reheat combustor through cooling passages in said first turbine.

2. A gas turbine driven powerplant as recited in claim 1, wherein said combustor receives a flow of hydrogen-rich fuel.

3. A gas turbine driven powerplant as recited in claim 1, wherein said hydrogen-rich fuel flows through cooling passages in said second turbine.

4. A gas turbine driven powerplant as recited in claim 1, further comprising heat exchanger means for producing a mixture of combustible hydrocarbon and steam, said heat exchanger means positioned downstream of said second turbine.

5. A gas turbine driven powerplant as recited in claim 4, wherein said mixture of combustible hydrocarbon and steam flows through cooling passages in said second turbine.

6. A gas turbine driven powerplant as recited in claim 4, further comprising fuel conversion means for producing said flow of hydrogen-rich fuel from said mixture of combustible hydrocarbon and steam.

7. A gas turbine driven powerplant as recited in claim 6, wherein said hydrogen-rich fuel flows to said reheat combustor through cooling passages in said first turbine.

8. A gas turbine driven powerplant as recited in claim 4, further comprising fuel conversion means for producing said flow of hydrogen-rich fuel from said mixture of combustible hydrocarbon and steam.

9. A gas turbine driven powerplant as recited in claim 8, wherein said hydrogen-rich fuel flows through cooling passages in said second turbine.

10. A gas turbine driven powerplant as recited in claim 9, wherein said hydrogen-rich fuel flows through cooling passages in said first turbine.

11. A gas turbine driven powerplant as recited in claim 1, further comprising a load connected to the shaft connecting said first turbine to said compressor means.

* * * * *